March 8, 1955   C. C. HUTCHINS ET AL   2,703,859
SINGLE PHASE ELECTRIC MOTOR

Filed Oct. 8, 1951   2 Sheets-Sheet 1

INVENTORS
CHARLES C. HUTCHINS
& BLAIR C. SEAMAN
BY Beuser & Harding
ATTORNEYS.

INVENTORS
CHARLES C. HUTCHINS
& BLAIR G. SEAMAN

United States Patent Office 2,703,859
Patented Mar. 8, 1955

2,703,859

SINGLE PHASE ELECTRIC MOTOR

Charles C. Hutchins and Blair C. Seaman, Ridgway, Pa., assignors to Hutchins Electric Company, Inc., Ridgway, Pa., a corporation of Pennsylvania Application October 8, 1951, Serial No. 250,276

6 Claims. (Cl. 318—221)

This invention relates to single phase electric motors and, more particularly, to means for providing high starting torque by the utilization of only the internal reactance effects within the motor.

Heretofore it has been customary in single phase motors to consider a phase splitting operation as dependent upon the combination of resistance and reactance variations between the motor windings. Alternately, use has been made of a capacitor for the purpose of offsetting the reactance of one winding with respect to the other although in this arrangement the resistance effect is also important. In the past it has been the practice to consider that, while external reactance combined with a partial internal reactance may be used for starting purposes, the result would be comparatively ineffective and only low torque values could be realized.

This invention provides an arrangement of motor windings which produces starting torque comparable to the torque obtained in the conventional capacitor motor. The invention, however, utilizes only the internal reactance of the motor to provide suitable displacement between the currents in the windings to provide these high starting torques and is a further development of the type of motor disclosed in the copending patent applications of Charles C. Hutchins, Serial No. 63,116, filed December 2, 1948, now Patent 2,649,561; Charles C. Hutchins and Blair C. Seaman, Serial No. 177,634, filed August 4, 1950, now Patent 2,697,809; and Charles C. Hutchins and Blair C. Seaman, Serial No. 182,329, filed August 30, 1950, now Patent 2,697,810.

It is an object of this invention to provide an arrangement of motor windings which will give rise to high starting torque without the use of a high reactance winding within the machine and without the use of means external to the windings of the machine for producing a displacement between the currents flowing in the windings.

It is another object of this invention to provide a motor employing relatively heavy wire throughout its windings, thus providing a motor which is more rugged and less expensive to build than the conventionally wound motors which employ high resistance windings wound from relatively fine wire.

It is a further object of this invention to provide what may be referred to as a starting winding and a running winding and means responsive to the current flowing in the running winding for deenergizing the starting winding as the motor comes up to speed.

These and other objects of the invention will become apparent from the following description when read in conjunction with the accompanying drawings, in which.

Figure 1:
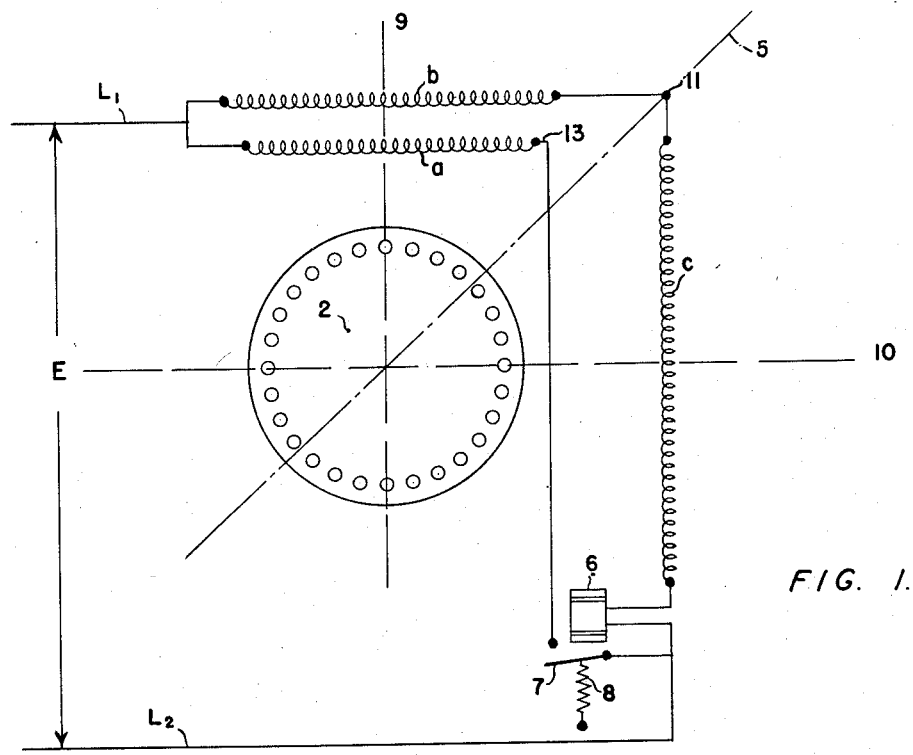
Figure 1 is a conventional motor diagram showing windings connected in accordance with this invention.
Figure 2:
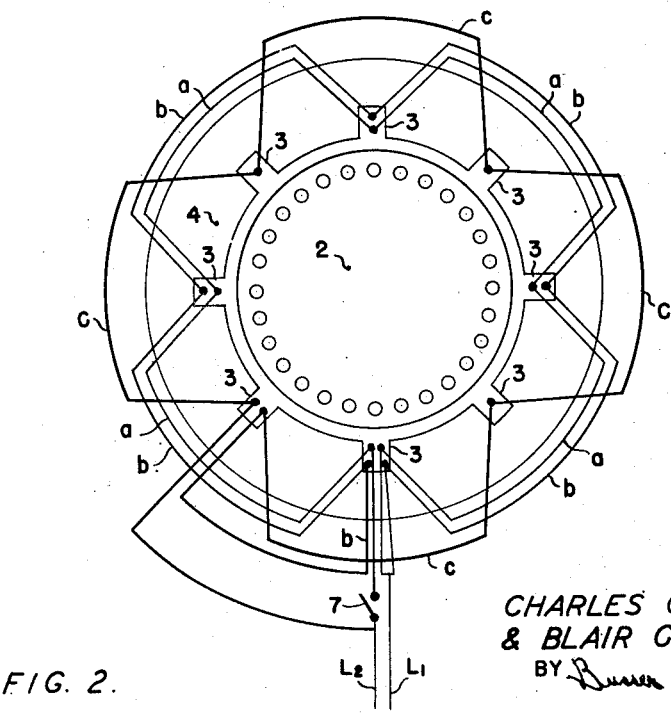
Figure 2 is a conventional showing of motor windings showing an arrangement of windings in accordance with the diagram of Figure 1.

In Figure 1 and 2 there is shown a squirrel cage rotor 2 which may be in the form of any of the various types of squirrel cage rotors. The rotor is surrounded by windings shown diagrammatically in Figure 1 as $a$, $b$ and $c$, the windings $a$ and $b$ being positioned on the axis 9 and 90 electrical degrees from winding $c$ which is positioned on the axis 10. The $b$ and $c$ windings are connected in series and that series combination is connected in parallel with the $a$ winding. The windings are connected across the power lines $L_1$ and $L_2$ which are connected to a suitable source of single phase power. The $b$ and $c$ windings may be considered as sections of a single winding extending for approximately 180 electrical degrees around the stator frame and being centered on a winding axis 5. It should be noted that the axis 9 of the $a$ winding and the axis 5 of the $b$-$c$ winding are displaced by less than 90 electrical degrees.

In Figure 2 these windings are shown disposed in conventional windings slots 3 in a stator framework 4. The $a$ and $b$ winding coils are connected to $L_1$ and are shown diagrammatically as a single line passing from slot to slot around the stator frame. It will be evident that these loops are representative of coils composed of a plurality of turns and are disposed in a plurality of slots in spiral, lap or other conventional coil arrangement and may be desirably employed with any particular motor. The $a$ and $b$ windings are disposed in the same winding slots and are, therefore, physically as well as electrically parallel to each other. The coils are arranged in the slots in magnetic additive relation, i. e., the fields surrounding the individual conductors of the two coils are in aiding relation. The $c$ winding is disposed in slots 90 electrical degrees from the $a$ and $b$ windings. It will be evident that rigid adherence to the 90° displacement is not necessary, and it is not intended that this disclosure be limited thereto.

There is also shown in Figure 1 a relay assembly for disconnecting the $a$ winding from the line. This assembly includes a relay coil 6 which is connected between the $c$ winding and line $L_2$ and is adapted to close the contact arm 7 in order to connect the $a$ winding to the line $L_2$ when the magnetic effort of the coil 6 is sufficient to overcome the restraining effort of the spring 8 tending to urge the contact 7 toward an open position.

The $b$ and $c$ windings are normally arranged to have the proper number of turns to provide for normal running operation of the motor. When the motor is deenergized and at a standstill condition, the contact 7 is open. When the $b$ and $c$ windings are first energized, the current drawn through the $b$ and $c$ windings and the coil 6 is sufficient to pull in the contact arm 7 and thus the $a$ winding is energized. After the contact arm 7 closes and the $a$ winding is energized, the coils of the $a$ winding, which have relatively fewer turns than the coils of the $b$ winding, draw a substantial current and set up a flux which links the $b$ winding. This flux linking the $b$ winding increases the reactance of the $b$ winding so that current flowing through the $b$ and $c$ windings is reduced in magnitude and is also greatly retarded in phase with respect to the current flowing through the $a$ winding. Thus the fields of the motor on the axes 9 and 10 are displaced, giving rise to a substantial starting torque within the motor.

As the motor comes up to speed, the current in the $b$ and $c$ windings will decrease and, by properly selecting the tension on the spring 8, the contact arm 7 will be opened as a result of the reduced field existing in the relay coil 6 as the current passing through the $b$ and $c$ windings decreases toward a normal running value. Thus, during running operation of the motor, the $a$ winding is removed from the line.

It will be evident that the relay arrangement disclosed herein may be replaced by more conventional centrifugally operating switching means or by other externally controlled switching means.

As previously described, the coils of the $a$ and $b$ windings are each disposed in the same winding slots and, therefore, the windings are mutually inductive. The turn ratios between the coils of the $a$ and $b$ windings must be properly selected, however, if the desired starting torque is to be produced. The turn ratios must be such as to provide a ratio between the currents in windings $a$ and $b$, and a lag in the current in windings $b$ and $c$ with respect to the current in winding $a$, so as to provide a substantial and effective time angle between the currents flowing with respect to the axes 9 and 10 of the motor in order to provide a torque when the motor rotor is at standstill condition. It will be evident that this turn ratio between the $a$ and $b$ windings will depend upon the physical proportions of the machine and the actual disposition of the coils of the windings. However, one skilled in the art can quickly arrive at the proper adjustment for any particular motor in the following manner. The windings $b$ and $c$ should be selected to have the proper number of turns for operating the motor under normal conditions after the switch 7 has been opened removing the $a$ winding from the line. The $b$ winding should have approximately from between 30% to 50% of the number of turns of the $c$ winding, and the $a$ winding should then have between approximately 25% to 75% of the number of turns of the $b$ winding. It will be apparent that these proportions are variable depending upon the proportions of the magnetic circuit involved. After the number of turns of the $b$ and $c$ windings has been selected, a trial number of turns for the $a$ winding may be established and a test made, whereupon the division of currents may be noted and the turns in the $a$ windings may then be adjusted by successive trial to produce the maximum torque.

It will be evident that the proper ratio of turns of the various windings may be determined from mathematical calculation alone. This process of calculation is, however, extremely complex, and the above empirical approach provides a means by which one skilled in motor winding may produce a motor in accordance with the present invention.

While the $a$ and $b$ windings have been previously referred to as being each disposed in the same winding slots, it will be evident that some of the coils of either of these windings may be placed in slots not containing coils of the other windings. Such an arrangement may produce an operative motor if the turn ratios of the $a$ and the $b$ windings are adjusted to compensate therefor. Generally speaking, however, a major portion of the coils of the two windings must be placed in the same winding slots as shown diagrammatically in Figure 2.

The windings shown in Figures 1 and 2 may alternately be connected with the relay coil 6 and the contact 7 at the $L_1$ end of the $b$ winding, and with the $a$ winding terminal 13 connected to the terminal 11 between the $b$ and $c$ windings. In this arrangement, the current through the $c$ winding is equal to the currents flowing through the $a$ and $b$ windings. While this connection provides a motor having a lower torque than the connection shown in Figure 1, it represents an entirely workable series parallel connection of a motor embodying this invention.

Figure 3:
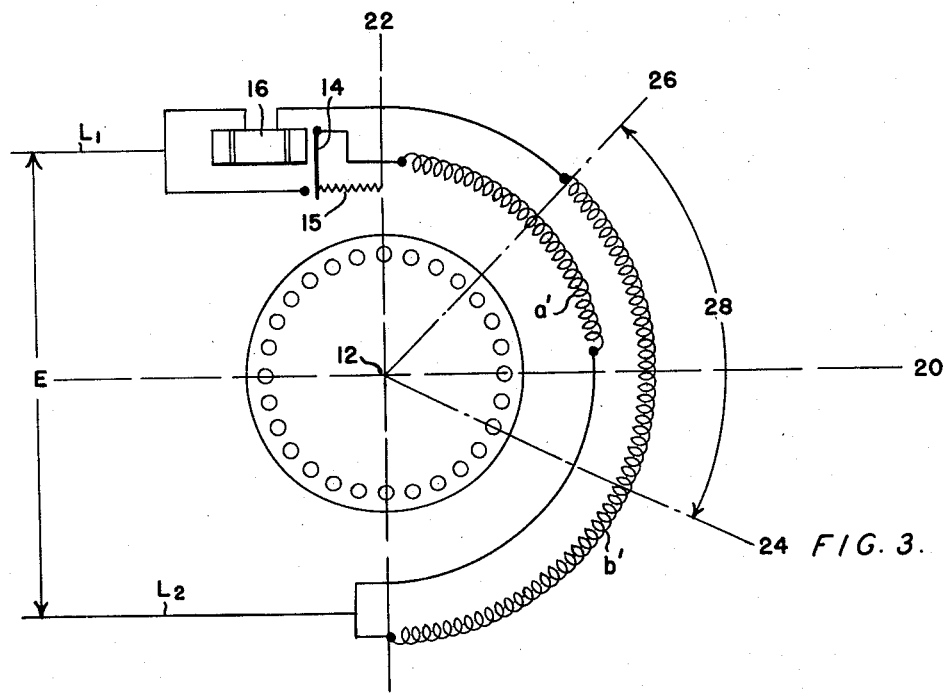
Figure 3 is a motor diagram showing an alternate form of motor winding in accordance with this invention.
Figure 4:
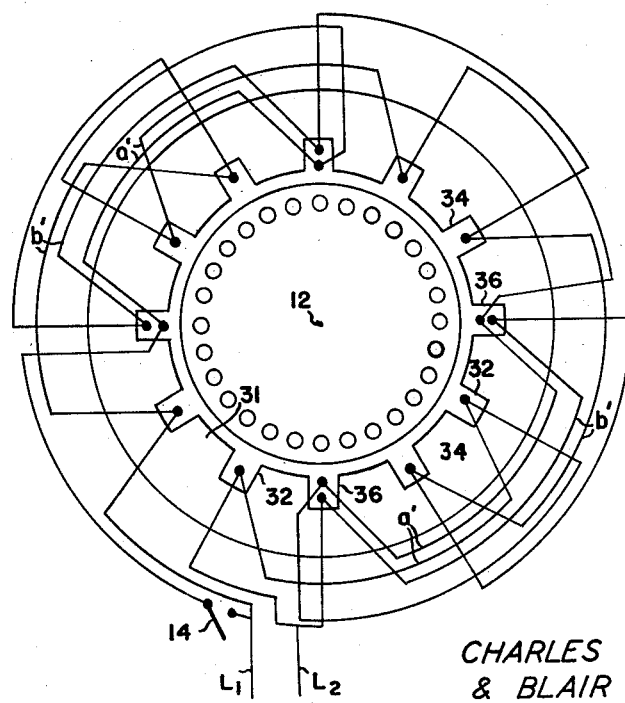
Figure 4 is a conventional showing of motor windings showing an arrangement of windings in accordance with the diagrams of Figure 3.

In the form of the invention shown in Figures 3 and 4, there is provided a squirrel cage rotor 12. The rotor is surrounded by windings shown diagrammatically in Figure 3 as windings $a'$ and $b'$, the winding $b'$ extending for less than 180 electrical degrees around the stator and the $a'$ winding being partially located in common winding slots with the $b'$ winding and being partially located in winding slots not carrying $b'$ windings. The axis 24 is the winding axis of the $b'$ winding and the axis 26 is the winding axis of the $a'$ winding. It is noted that these winding axes are located at a position other than 90° from each other.

The windings $a'$ and $b'$ are connected to the power supply at $L_1$ and $L_2$, the coil 16 of a relay being placed in series with the $b'$ winding and serving to control a contact 14 which closes against the urging of spring 15 when there is sufficient current flow through the coil 16. When the contact 14 is closed, the $a'$ or starting winding is energized by connection by the power supply lines $L_1$, $L_2$.

The $b'$ winding in this form of the invention is arranged to have the proper number of turns to provide for normal running operation of the motor. The $a'$ winding which partly overlaps the $b'$ winding is the starting winding of the motor and, while this winding may be entirely confined to winding slots common with the $b'$ winding, such arrangement is not necessarily required. The amount of overlap employed determines the mutual reactance effect between the two windings and depending upon the physical proportions of the machine, the disposition of the coils and the number of turns employed, this overlap may be made to a greater or less extent. The ratio of the conductors of the $a$ winding per slot may vary from approximately 30% to 100% of those in the $b$ winding per slot. Inasmuch as both the number of turns of the windings and the percentage overlap of the $a'$ winding with respect to the $b$ winding influence the degree of mutual reactance effect involved, it will be evident that these relationships are interdependent for a machine having selected physical proportions.

In Figure 4 there is shown windings as diagrammed in Figure 3 disposed in conventional winding slots in a stator framework. The $a'$ and $b'$ windings are connected to $L_2$ and are shown diagrammatically as a single line passing from slot to slot around the stator frame. It will be evident that the loops $a'$ and $b'$ are representative of coils composed of a plurality of turns which may be disposed in a plurality of slots in the stator. In Figure 4, three pairs of slots per pole are employed to indicate the relationship of the coils in the slots, the slots 32 containing only $a'$ or starting windings, the slots 34 containing only $b'$ or running windings and the slots 36 containing both $a'$ and $b'$ windings. It will be evident that in practice each of these pairs of slots could be replaced by a multiple of pairs of slots and not necessarily the same number for each. For example, the winding disposition generally indicated in Figure 3 might involve three pairs of slots for the portion of the $b'$ or running winding and one pair of slots for the $a'$ winding alone and one pair of slots for the $a'$ and $b'$ windings together. The $a'$ and $b'$ windings are disposed adjacently in the slots in which they are common to each other and in magnetic additive relation. The windings, are, therefore, physically as well as electrically parallel to each other with their fields in aiding relation.

A particular advantage in the present invention resides in the fact that relatively heavy wire may be used throughout all of the winding coils, thus giving the machine high thermal capacity which means that the motor is far more rugged and substantial than motors utilizing fine wire in order to produce high resistance winding coils as are conventionally required to provide phase displacement between currents for starting. The temperature rise of fine wire coils may be extremely high and the cost of producing such coils is greater than the cost of producing relatively heavy wire.

It is realized that the teachings of this disclosure are contrary to published information on single phase motor construction. The turn ratio required to produce the high starting torque obtained by following this disclosure is a critical value and its existence has not heretofore been realized. As previously stated, exact turn ratios and winding patterns cannot be set forth in that these ratios and patterns vary depending upon the characteristics of the magnetic circuit for any particular electric motor involved. By following the teachings of this disclosure it will be possible for one skilled in the motor winding art to produce a motor in accordance with the present invention. It will be apparent, however, that various modifications may be made in the embodiment of the invention as disclosed herein without departing from the scope of the invention as set forth in the following claims.

What is claimed is:

1. A single phase alternating current motor comprising a first winding and a second winding connected in parallel and adapted to be connected across an alternating current source, said first and second windings having their coils positioned so that thte polar axes of said windings are displaced less than 90 electrical degrees, said first and second windings having coils in mutually inductive and substantially cumulative relation to produce a substantial phase displacement between the winding currents for motor starting.

2. A single phase alternating current motor comprising a first winding and a second winding connected in parallel and adapted to be connected across an alternating current source, said first and second windings having their coils positioned so that the polar axes of said windings are displaced less than 90 electrical degrees, said first winding having coils extending over an arc of substantially lesser number of electrical degrees than said second winding, said first and second windings having coils in mutually inductive and substantially cumulative relation to produce a substantial phase displacement between the winding currents for motor starting.

3. A single phase alternating current motor comprising a first winding and a second winding connected in parallel and adapted to be connected across an alternating current source, said first and second windings having their coils positioned so that the polar axes of said windings are displaced less than 90 electrical degrees, said first and second windings having coils in mutually inductive and substantially cumulative relation to produce a substantial phase displacement between the winding currents for motor starting and to increase the reactance of said second winding during periods of current flow through said first winding.

4. A single phase alternating current motor comprising a first winding and a second winding connected in parallel and adapted to be connected across an alternating current source, said first and second windings having their coils positioned so that the polar axes of said windings are displaced less than 90 electrical degrees, said first and second windings having coils in mutually inductive and substantially cumulative relation to produce a substantial phase displacement between the winding currents for motor starting, and means responsive to the magnitude of the current flowing through said second winding for interrupting the flow of current through said first winding when the motor approaches running speed.

5. A single phase alternating current motor comprising a first winding and a second winding connected in parallel and adapted to be connected across an alternating current source, said first and second windings having their coils positioned so that the polar axes of said windings are displaced less than 90 electrical degrees, said first winding having coils extending over an arc of substantially lesser number of electrical degrees than said second winding, at least some of the coils of said first winding being in mutually inductive relation with some of the coils of said second winding to increase the reactance of said second winding, to produce a substantial phase displacement between the winding currents during motor starting and to produce in combination with the normally existing motor countervoltage induced therein a reducing phase displacement between the winding currents as the motor speed increases.

6. A single phase alternating current motor comprising a first winding and a second winding connected in parallel and adapted to be connected across an alternating current source, said first and second windings having their coils positioned so that the polar axes of said windings are displaced less than 90 electrical degrees, said first winding having coils extending over an arc of substantially lesser number of electrical degrees than said second winding, at least some of the coils of said first winding being in mutually inductive relation with some of the coils of said second winding to increase the reactance of said second winding, to produce a substantial phase displacement between the winding currents during motor starting and to produce in combination with the normally existing motor countervoltage induced therein a reducing phase displacement between the winding currents as the motor speed increases, and means responsive to the magnitude of the current flowing through said second winding for interrupting the flow of current through said first winding when the motor approaches running speed.

References Cited in the file of this patent

UNITED STATES PATENTS

| | | |
|---|---|---|
| 1,933,497 | Morrill | Oct. 31, 1933 |
| 1,934,060 | Hanning | Nov. 7, 1933 |
| 1,974,989 | Hamm | Sept. 25, 1934 |
| 2,236,436 | Lyden | Mar. 25, 1941 |
| 2,320,252 | Vaughan | May 25, 1943 |

FOREIGN PATENTS

| | | |
|---|---|---|
| 834 of 1898 | Great Britain | Jan. 11, 1898 |
| 18,837 of 1910 | Great Britain | Aug. 10, 1910 |
| 617,251 | France | Nov. 19, 1926 |
| 774,187 | France | Sept. 17, 1934 |